UNITED STATES PATENT OFFICE.

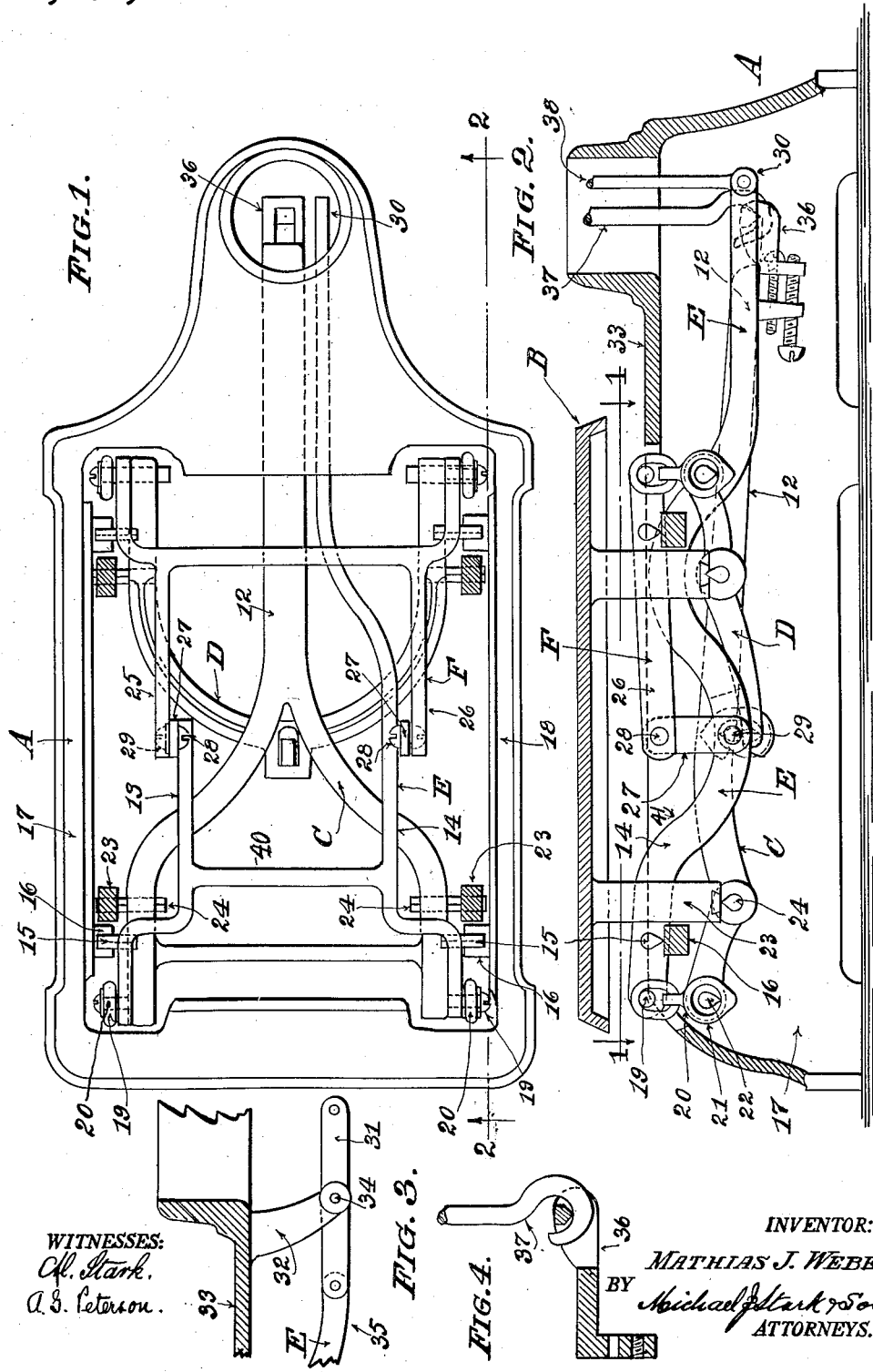

MATHIAS J. WEBER, OF CHICAGO, ILLINOIS.

WEIGHING-SCALE.

1,261,661. Specification of Letters Patent. Patented Apr. 2, 1918.

Application filed March 3, 1917. Serial No. 152,229.

*To all whom it may concern:*

Be it known that I, MATHIAS J. WEBER, a citizen of the United States, and a resident of the city of Chicago, in the county of Cook and State of Illinois, have invented a certain new and useful Improvement in Weighing-Scales; and I do hereby declare that the following description of my said invention, taken in connection with the accompanying sheet of drawing, forms a full, clear, and exact specification, which will enable others skilled in the art to which it appertains to make and use the same.

My invention relates generally to improvements in weighing scales; and it consists, essentially, in the novel and peculiar combination of parts and details of construction, as hereinafter first fully set forth and described and then pointed out in the claims.

This invention has for its object the utilization of the pressure exerted upon the fulcra supports of the beams or levers located in the base of platform scales.

It is well understood that in this class of weighing scales there is a pressure exerted upon the fulcra supports of the before-mentioned scale beams or levers depending upon the weight placed upon the scale platform, and the proportions or ratio of said levers. If it is assumed that a weight of 100 pounds is placed on the scale platform, and the ratio of the long and short arms of the levers is as 1:10, then there will be a pressure exerted upon the fulcra bearings of 90 pounds. In the scales under consideration there are four of these fulcra bearings, so that each support carries a weight of 90:4=22½ lbs.

But since in my present construction I aggregate this force acting upon said bearings, I have the entire 90 pounds available to perform useful work, as will hereinafter appear.

I accomplish the desired result by introducing in the base of the scales a second set of levers, which levers carry the fulcrum supports of the first, or principal set of levers, so that a downward movement of the fulcra of the principal set of levers causes a corresponding movement of the second or auxiliary set of levers.

To illustrate this point, I refer to the drawings forming part of this specification, and in which Figure 1 is a plan of a scale base below the line 1—1 of Fig. 2, containing the aforesaid sets of levers. Fig. 2 is a sectional elevation on line 2—2 of Fig. 1. Fig. 3 is a fragmental sectional view of a part of my invention. Fig. 4 is a similar view showing details of construction.

A, in these drawings indicates the base of a platform scale, and B, the platform thereon. In the usual construction of platform scales there are in this base two levers, C, D, respectively, the lever C overlying the lever D, and having a long arm 12, to the extreme end of which the usual rod 37, connecting this arm to the weight-carrying beam or beams in the head of the scales, is pivoted. These levers have, usually, fixed supports for the fulcra thereof in the base; but in my present construction these levers are suspended from a second set of levers, E, F, in the following manner:

The auxiliary lever E comprises two bars 13, 14, each of which has at a suitable distance from one end, a knife-edged fulcrum pin 15, which pin rests upon bearing brackets 16, protruding inwardly from the inner side of the side walls 17, 18, of the base. The bars 13, 14, of the auxiliary lever E are fixedly and integrally connected, approximately medially of their length, by a crossbar 40, as shown in Fig. 1, the object of which is to so rigidly connect these two members 13, 14, that they must, under all conditions of stress or strain, move synchronously when matter is placed on the scale platform. At the extreme ends of the bars 13, 14, there are pins 19, which may be either screws as shown in Fig. 1, or the usual knife-edged pins; and on these pins 19 there are hung downwardly extending shackles 20, having each an eye 21, which is engaged by the knife-edged pin 22, Fig. 2, located at the extreme ends of the lever C.

The lever C is acted upon by downwardly extending posts 23, projecting from the lower surface of the platform B, and bearing with their extreme ends upon the knife-edged fulcrum pins 24 on the principal lever C.

The member 14 of the lever E is extended to reach backward in the base A and adjacent the arm 12, as at 30, so that the movement of this arm may be communicated to, and utilized for imparting movement to, any desired mechanism, not shown, such as are usually found in automatic weighing scales for rotating the cylinder, drum, or disk, having indicia for indicating cost, and for other purposes, such as communicating movement to a second scale weighing beam located remote from the primary scale, for weighing matter placed on the primary scale, to check the weighing of the latter scale.

The auxiliary lever F is constructed, supported in the base, and connected to the principal lever D precisely the same as has hereinbefore been described in connection with the auxiliary lever E, so that a detailed description is deemed unnecessary, except to state that the extreme ends of the members 25, 26, of this lever F, are connected to the members 13, 14, of the auxiliary lever E, by links 27, which links may have knife-edged pins, or in the cheaper construction, common screws 28, to connect the links to the members 25, 26, and 13, 14, respectively.

In operation, when matter is placed upon the platform B, this platform will move downwardly, and the posts 23 thereon acting on the fulcrum pins 24, will cause a corresponding downward movement of the primary levers C, D, and these, in turn, a downward movement of the extreme ends of the levers E, F, and an upward movement of the long arm 30 of the lever E. If, however, it is required that this movement of the extremity of the lever E be in a downward direction, then I shall shorten the long arm of the lever E, and provide a short lever 31, pivoted in a bracket 32, projecting downwardly from the inner surface of the top wall 33 of the base, by a pivot 34, and connect one end of this lever 31 to the terminal 35 of said lever E, which will reverse the direction of movement of the long arm of the lever E, or rather the movement of the end of the lever 31 remote from the terminal of the shortened long arm of the lever E, to which a rod 38, may be pivoted, by which movement may be communicated to the element or elements hereinbefore mentioned. And if it is an object to avoid multiplication of moving parts to prevent friction, I shall construct the supporting points of the levers by changing the fulcra of these levers in a manner readily understood by persons versed in the art of manufacturing scales.

The extreme end of the long arm 12 of the principal lever C is provided with means, 36, for adjusting the length of the long arm 12, and to this element there is hitched the upwardly extending rod 37, which connects with the usual weighing beams in the head of the scales or other counterbalancing means not shown.

Attention is now directed to the fact that the pair of auxiliary levers E, F, are placed entirely over the pair of primary levers, and that in order to accomplish this result, the arms 13, 14, of the lever E are downwardly curved as indicated at 41, Fig. 2, while the arms 25, 26, of the auxiliary lever F are straight, the object of thus curving the members 13, 14, being to afford spaces between the adjacent terminals of the arms 13, 14, and the arms 25, 26, for the link connections 27, already referred to. And it may be noted that the long arm of the auxiliary lever E is upwardly and downwardly bent beyond the point of attachment of the link 27, in order to pass over, and not interfere with the curved portion of the primary lever D and under the cross bar 40' of the auxiliary lever F.

While I have hereinbefore described the preferred embodiment of my invention, I desire it to be distinctly understood that details of construction may be considerably varied without departing from the scope of my invention as defined in the subjoined claims.

Having thus fully described this invention, I claim as new, and desire to secure to myself by Letters Patent of the United States—

1. In weighing scales, the combination, of a base, a vertically movable platform mounted on said base, a pair of principal levers in said base, posts depending from said platform and bearing upon said principal levers, a pair of auxiliary levers mounted in said base above said principal levers, said auxiliary levers comprising each two arms in parallel spaced relationship, said arms being connected approximately medially of their length by a cross bar, the adjacent terminals of said arms being link-connected, brackets extending inwardly from said base constructed to support said auxiliary levers, and means connecting said auxiliary levers to said principal levers, said means including pivots at the terminals of said auxiliary levers, other pivots at the terminals of said principal levers, and shackles connecting said pivots, said pivots having knife edges, said shackles having eyes constructed to receive said pivots.

2. In weighing scales, the combination, of a base, a platform movably mounted on said base, a pair of principal levers mounted in said base, said principal levers having knife-edged pivots, posts depending from said platform and bearing upon said knife-edged pivots, brackets extending inwardly from said base, a pair of auxiliary levers in said base, said auxiliary levers being entirely overlying the principal levers, said auxiliary levers having knife-edged pivots bearing upon said brackets, said auxiliary levers comprising each two arms in parallel spaced relationship, said arms being connected approximately medially of their length by a cross bar, said cross bar being integrally formed with said arms, the adjacent terminals of said arms being connected by links, one of the principal, and one of the auxiliary levers having each a long arm extending rearwardly in said base, said long arms being constructed to receive elements to which vertical movement is imparted by said long arms.

3. In weighing scales, the combination, of a base, a platform movably mounted on said base, a pair of principal levers mounted in said base, said principal levers having knife-edged pivots, posts depending from said platform and bearing upon said knife-edged pivots, brackets extending inwardly from said base, a pair of auxiliary levers in said base, said auxiliary levers overlying said principal levers, said auxiliary levers having knife-edged pivots bearing upon said brackets, said auxiliary levers comprising each two arms in parallel spaced relationship, said arms being connected approximately medially by a cross bar, the adjacent ends of said arms being connected by links, one of the auxiliary levers having a long arm, a further lever at the terminal of said long arm, a support for said latter lever, said latter lever being pivotally connected to the terminal of said long arm, and means at the free end of said latter lever for transmitting vertical movement of said latter lever.

In testimony that I claim the foregoing as my invention, I have hereunto set my hand.

MATHIAS J. WEBER.